J. WINTERMAYR.
CONSTRUCTION OF POWER LOOMS.
APPLICATION FILED JUNE 17, 1909.
1,080,091.
Patented Dec. 2, 1913.
2 SHEETS—SHEET 1.
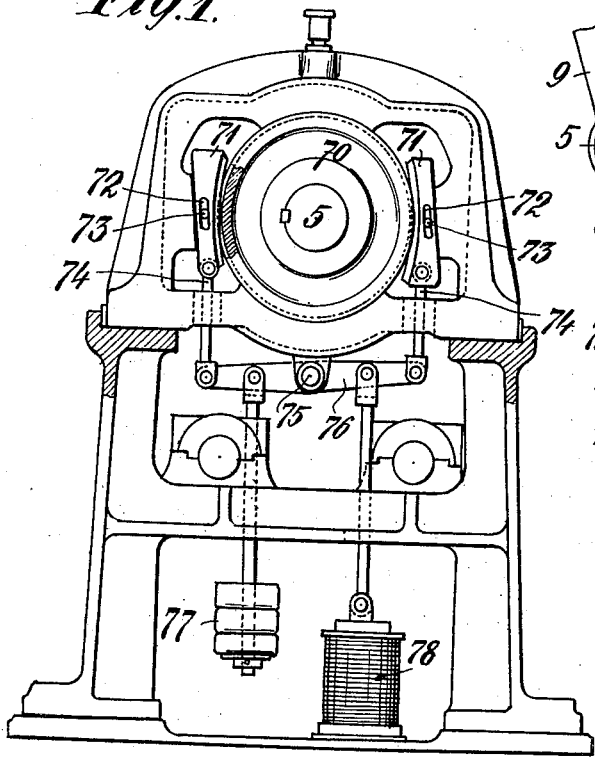
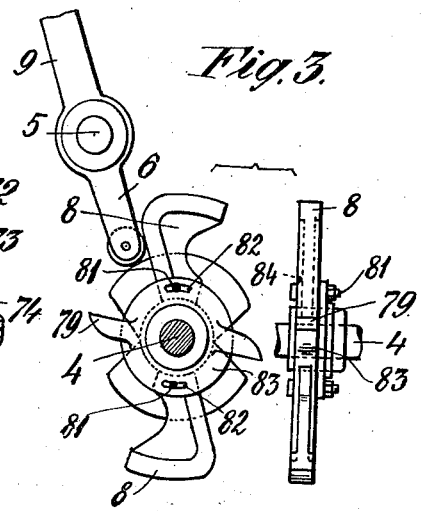
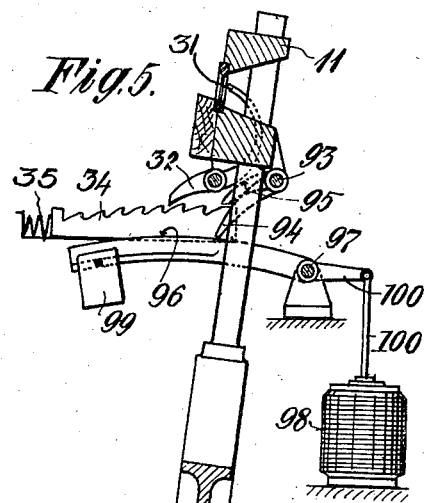
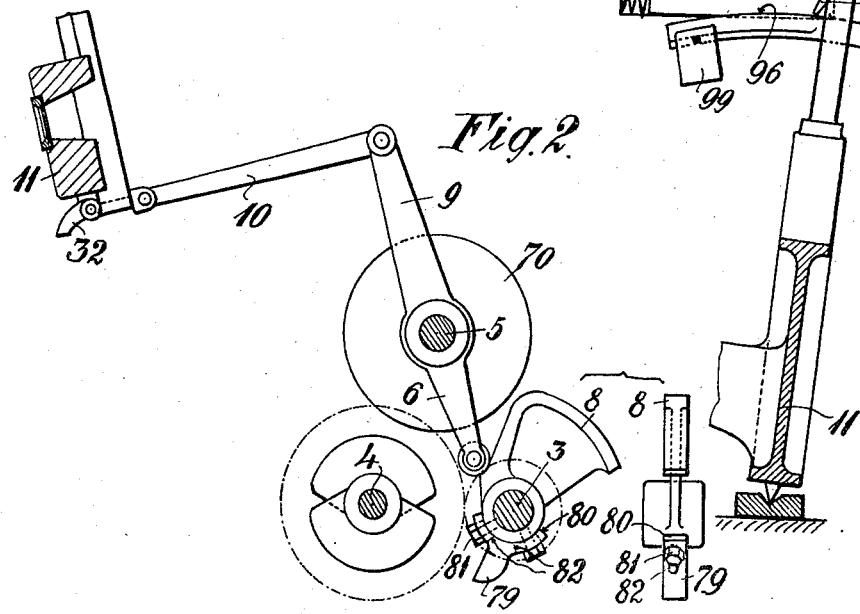
Witnesses
L. H. Staaden
A. Hayet
Inventor
Josef Wintermayr
by
his Attorney

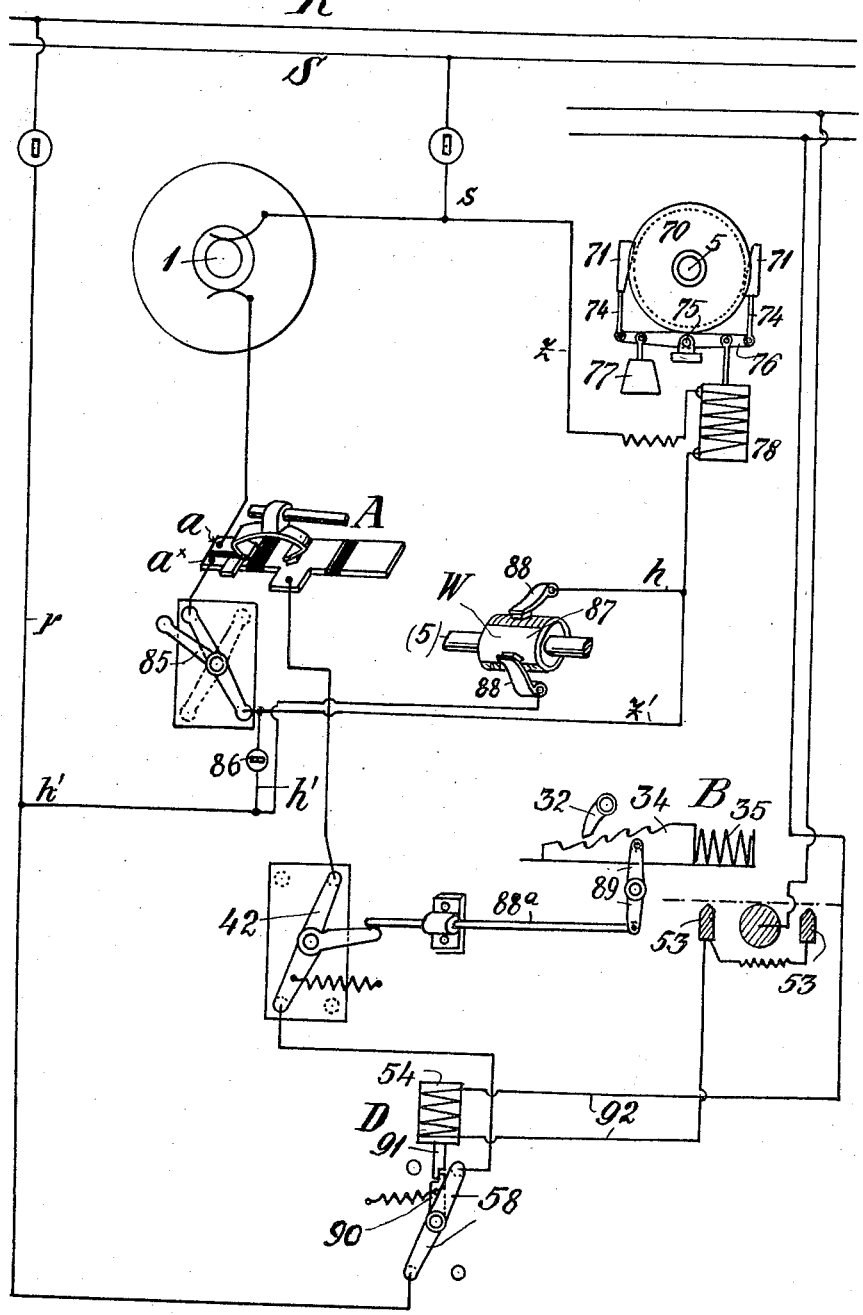

UNITED STATES PATENT OFFICE.

JOSEF WINTERMAYR, OF VIENNA, AUSTRIA-HUNGARY.

CONSTRUCTION OF POWER-LOOMS.

1,080,091.  Specification of Letters Patent.  Patented Dec. 2, 1913.

Application filed June 17, 1909. Serial No. 502,674.

*To all whom it may concern:*

Be it known that I, JOSEF WINTERMAYR, a citizen of Austria-Hungary, and residing at Vienna, in the Province of Lower Austria, in the Empire of Austria-Hungary, engineer, have invented certain new and useful Improvements in Construction of Power-Looms, of which the following is a full, clear, and exact specification.

My invention relates to certain improvements in power looms of the type, such as described in the specification of my co-pending application, Serial No. 434,040, filed May 21st, 1908, in which type of looms the freely falling lay may be held at any desired position in its falling movement by means of a brake device, mounted on the lay actuating shaft and so connected with the driving mechanism that when the lay is stopped, either intentionally or automatically, the brake will instantly come into action to stop the lay actuating shaft, thereby holding the lay in its position. For this purpose, electro-mechanical means, comprising an electro-magnetic clutch on the drive-shaft and an electro-magnetic brake on the lay actuating shaft have been used, according to my said application. Since electric current, however, is not always obtainable and as the initial cost of electric installation of this kind is considerable, purely mechanical means for stopping the lay may frequently have economical advantages. Such mechanical means may be either a ratchet mechanism or a block brake, and the latter means is particularly desirable for the reason that the action of a block brake is quick and smooth. According to my present invention, the brake is kept inactive by means of a solenoid, normally energized by an electric current. The solenoid is located in a common circuit with the electro-magnetic clutch mounted on the drive shaft, so that upon the opening of said circuit, the brake under the action of a weight or spring will instantly come into action to stop the lay.

In the drawing, Figure 1 shows partly in section the arrangement of a block brake under the control of a weight for closing the brake and a solenoid for opening the brake. Fig. 2 shows a conventional arrangement for rocking the lay actuating shaft by means of a cam mounted on a counter-shaft; Fig. 3 shows a similar arrangement, in which a double cam for rocking the lay actuating shaft is mounted on the harness shaft. Fig. 4, is a diagram, showing the electrical connections.

In the construction according to Figs. 1 and 2, the lay actuating shaft 5 carries a brake disk 70, adapted to be engaged by oppositely disposed brake blocks 71, which are provided with tapering ribs, adapted to be engaged by a correspondingly shaped groove in the brake-disk. The blocks 71 are pivotally connected by rods 74 to the arms of a double lever 76, fulcrumed at 75. This lever is subjected on one side of its pivot 75 to the action of a weight 77 and on the other side of its pivot to the action of a solenoid 78, the arrangement being such that the brake is normally kept open by the solenoid 78, which is normally energized. The blocks 71 are provided with inclined slots 72 engaged by fixed pins 73. If the blocks 71, therefore, are moved in a vertical direction, they are brought by the inclined slots in immediate contact with the brake disk, and as the blocks tend to follow the movement of said disk, they become wedged between the disk and the oppositely inclined guiding faces in the frame, so that an almost instantaneous braking takes place. This arrangement is a great advantage over an arrangement where a weight is used to keep the brake normally disengaged, the closing of the brake being effected in that case by energizing the solenoid. To energize the solenoid takes of course a certain time, which under certain circumstances may lead to a failure to stop the lay actuating shaft, for instance when it becomes necessary to stop the lay just before the completion of its falling movement. With the present arrangement, however, where the brake blocks are brought in engagement with the brake disk by the weight, such failure is absolutely impossible, since the weight will come into immediate action at the instant the solenoid 78 becomes deënergized.

Even when the solenoid is again energized, the blocks 71, due to the resistance, are not completely released and they remain in engagement with the disk 70 sufficiently to keep the lay in suspended position, until, by means of a cam, rocking motion is again imparted to the lay actuating shaft 5 carrying the brake disk 70. With this method of operating the brake, it is evident that the exact coöperation of the lay with the remaining parts of the driving mechanism of the loom is insured. In this way, the lay is prevented from falling on the fabric when the loom is being started and the lay will only fall after having been brought previously to its highest position. For relieving the brake, the time necessary to energize the solenoid is immaterial, as the starting of the loom is only gradual.

Reference is now had to the diagram shown in Fig. 4. In this diagram, S, and R designate the two conducting wires of the working circuit, connected to a common source of electrical energy. S is the main supply conductor and R the main return conductor. A is the main switch. 1 is an electro-magnetic coupling mounted on the driving shaft of the loom. In the diagram, there is further shown the arrangement of a shuttle controller B with its corresponding circuit breaker 42, and a warp thread controller D with conductor bars 53, solenoid 54 and circuit breaker 91, 90, 58, and there is also a switch W, which closes a parallel circuit for the solenoid 78, when the lay is in its highest position and the loom is stopped for any reason. The diagram, moreover, shows two switches 85 and 86. The former is a manually operated switch for closing the shunt circuit $z$, $z'$, in which the solenoid 78 is placed, while the switch 86 is used to continually energize the solenoid for the purpose of maintaining the brake blocks 71 out of engagement with the brake disk 70. The switch W is mounted on the lay actuating shaft 5 and carries a commutator 87, adapted to connect the two brushes 88, thereby closing the solenoid circuit short with the return wire R when the lay is at its highest position, before it begins to fall. If, for any reason, at this moment the loom is suddenly stopped, the solenoid 78 will remain energized and the lay will remain at its highest position, so that, if the loom is started again, the lay may fall immediately against the fabric.

Under normal conditions, switch 85 is supposed to be closed, as shown by the full lines in Fig. 4. In this position of the switch 85 the current will pass through the wire $z'$, the switch 85 and the shunt contact $a^x$ of the main switch A. If the lay, however, is in its highest position, the solenoid current will pass through the commutator 87 directly to the return wire R, so that the interruption of the main circuit at this moment has no effect upon the solenoid 78, the lay thus being held mechanically in its highest position.

Should it become necessary to open the warp threads in order to remove a shot, the switch 85 is reversed so as to occupy the position shown by the broken lines in Fig. 4. In this position of the switch 85, no current can pass through solenoid 78, and, consequently, the weight 77 will operate to pull the brake block 71 into engagement with the brake disk 70, while the lay is held in its highest position. If, however, the lay is to be continuously released, so that it can lie against the edge of the fabric, as for instance when the cloth is cut off, the switch 86, which is arranged in a connection between the conductors $z'$ and $h'$ is closed, whereby the solenoid 78 is continuously short-circuited.

The shuttle-controller B is rendered more sensitive by the provision of the spring actuated switch 42, which is held closed by a rod $88^a$, that is connected by a lever 89 to a sliding rack bar 34, adapted to be engaged by the pawl 32 of the shuttle controller. A small displacement of the rack-bar 34 is therefore sufficient to release the switch 42 and to thereby open the circuit at this place.

A similar arrangement is used in connection with the warp-thread controller D, where the spring-actuated switch 58 is provided with a finger 90 that is engaged by the core 91 of a solenoid 54. When the shunt circuit 92 is closed by means of one of the bars 53 through the breaking of a warp thread and the solenoid 54 thereby becomes energized, the least pull on the core 91 will be sufficient to release the switch 58 to open the circuit.

The loom described in my said application is especially intended for the weaving of wire cloth, in which the main stroke of the lay is followed by a short second stroke, called a double stroke. In order to be able to accurately time the second stroke, the cam for rocking the lay actuating shaft 5 is made in two parts. The cam 8 for producing the main stroke is mounted either on the harness shaft 4 (Fig. 3), or on a separate counter-shaft 3 (Fig. 2). The tappet 79 for producing the short second stroke is provided with a flange 80, whereby it may be secured on the boss of the cam 8 by means of studs 81, entering slots 82, provided in the flange in exact position relative to said cam 8. In the construction shown in Fig. 3, the lay actuating shaft 5 is operated by a cam 8, having two projections arranged diametrically opposite each other. The tappets 79 are formed in this case integral with the ring 83, whose position on the boss of the main cam 8 may likewise be adjusted by means of screws 81, entering slots 82 in said ring.

I claim:

1. In a power loom the combination with the lay and operating means therefor, of a brake adapted to arrest the lay, an electric circuit, a solenoid arranged in said circuit and adapted when energized to maintain the brake in inoperative condition, means to operate the brake and an automatic switch adapted to permit the said means to operate the said brake.

2. In a power loom the combination with the lay and the lay actuating shaft, of a brake-disk mounted on said shaft, brake blocks arranged to coöperate with said brake-disk, a weight for operating the brake blocks, an electric circuit adapted to keep, while energized, the said brake blocks out of engagement with said brake-disk, and an automatic switch adapted to break the circuit, thereby permitting the brake blocks to be brought into engagement with said brake-disk by said weight.

3. In a power loom the combination with the lay and its actuating shaft, of a brake for said shaft, means for operating said brake, an electric circuit, a solenoid located therein and adapted, while energized, to maintain the brake inoperative, a main switch in said circuit, a shunt, and a second switch adapted, when reversed, to cut out the said solenoid, thereby causing the lay to be held in its position.

In testimony whereof I have signed my name unto this specification in the presence of two subscribing witnesses.

JOSEF WINTERMAYR.

Witnesses:
WILHELM BERGER,
ROBERT W. HEINGARTNER.